United States Patent [19]
Long

[11] Patent Number: 6,057,615
[45] Date of Patent: May 2, 2000

[54] BRACKET TO ATTACH A CAPACITOR TO A MOTOR HOUSING

[75] Inventor: Norman R. Long, Tipp City, Ohio

[73] Assignee: A. O. Smith Corporation, Milwaukee, Wis.

[21] Appl. No.: 09/365,294

[22] Filed: Jul. 30, 1999

[51] Int. Cl.[7] .............................. H02K 11/00; F16L 3/12
[52] U.S. Cl. ....................... 310/68 R; 310/72; 248/227.3
[58] Field of Search .................... 310/68 R, 72, 310/89, 91; 29/596–598; 361/807, 809, 810, 513, 821, 825; 248/227.3, 230.1

[56] References Cited

U.S. PATENT DOCUMENTS

| | | | |
|---|---|---|---|
| 2,003,031 | 5/1935 | Baker | 310/68 R |
| 2,253,405 | 8/1941 | Veinott | 310/68 R |
| 2,460,903 | 2/1949 | Peck | 310/68 R |
| 2,683,824 | 7/1954 | Carville et al. | 310/68 R |
| 3,210,457 | 10/1965 | Hancock et al. | 174/48 |
| 3,395,298 | 7/1968 | Shifley | 310/68 R |
| 3,490,820 | 1/1970 | Lewis | 310/68 R |
| 3,889,909 | 6/1975 | Koscik | 248/56 |
| 4,231,675 | 11/1980 | Scozzafava | 403/252 |
| 4,682,748 | 7/1987 | Freudenmann et al. | 248/73 |
| 5,039,040 | 8/1991 | Idjakiren | 248/73 |
| 5,245,237 | 9/1993 | Fisher et al. | 310/89 |
| 5,261,633 | 11/1993 | Mastro | 248/74.1 |
| 5,277,387 | 1/1994 | Lewis et al. | 248/74.2 |
| 5,493,158 | 2/1996 | Daniels | 310/68 |

*Primary Examiner*—Thomas M. Dougherty
*Assistant Examiner*—Tran Nguyen
*Attorney, Agent, or Firm*—Michael Best & Friedrich LLP

[57] ABSTRACT

A bracket for attaching a capacitor with an engagement portion to a motor having therein a keyhole with a rectangular portion and a circular portion. The bracket includes a first semicylindrical member having a first downwardly extending portion and a first hinge portion and a second semicylindrical member having a second downwardly extending portion and a second hinge portion. The first hinge portion and second hinge portion are engageable to form a hinge with an axis about which the semicylindrical members are pivotable to open and closed positions. When in the open position, the semicylindrical members permit the capacitor to be removed from the bracket. When in the closed position, the semicylindrical members define a cylinder having an axis and including a capacitor engagement portion for engaging the capacitor, thereby retaining the capacitor in the bracket. The downwardly extending portions define a mounting extension having an axis perpendicular to the cylinder axis and including a horizontally extending locking extension. The mounting extension is insertable into the motor keyhole so that when the bracket is pivoted about the mounting extension axis to a locked position, the locking extension prevents removal of the mounting extension from the keyhole. The bracket further including a locking projection portion to lock the bracket in the locked position when the bracket is pivoted about the mounting extension axis to the locked position.

10 Claims, 3 Drawing Sheets

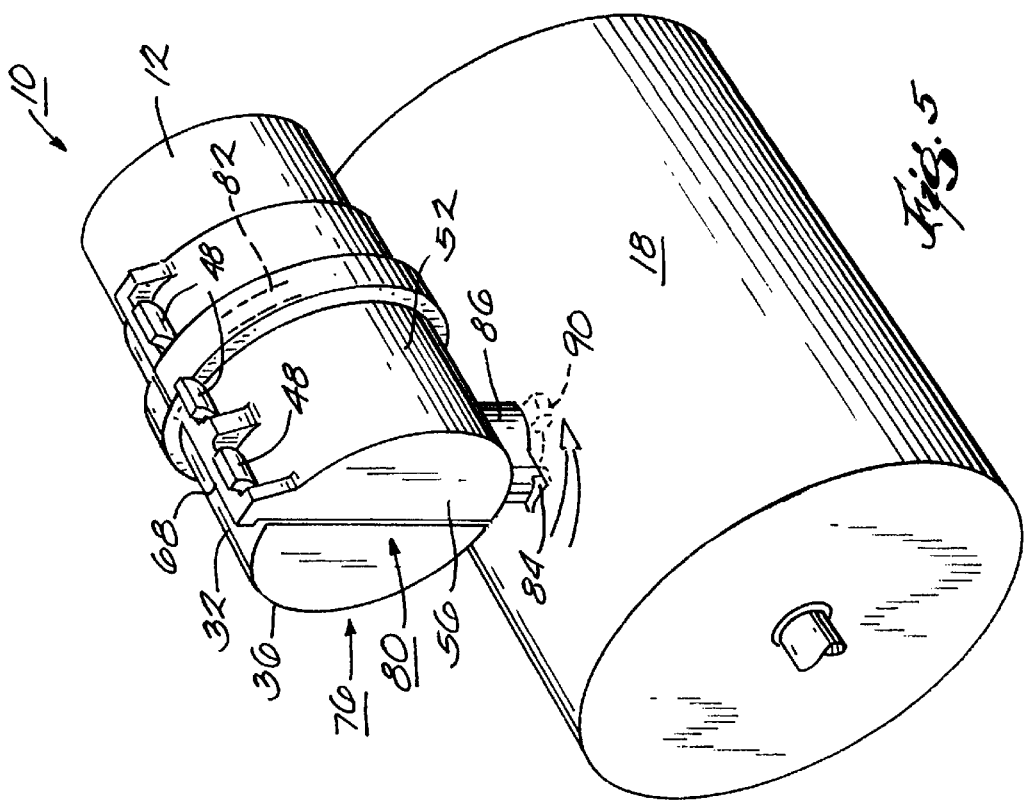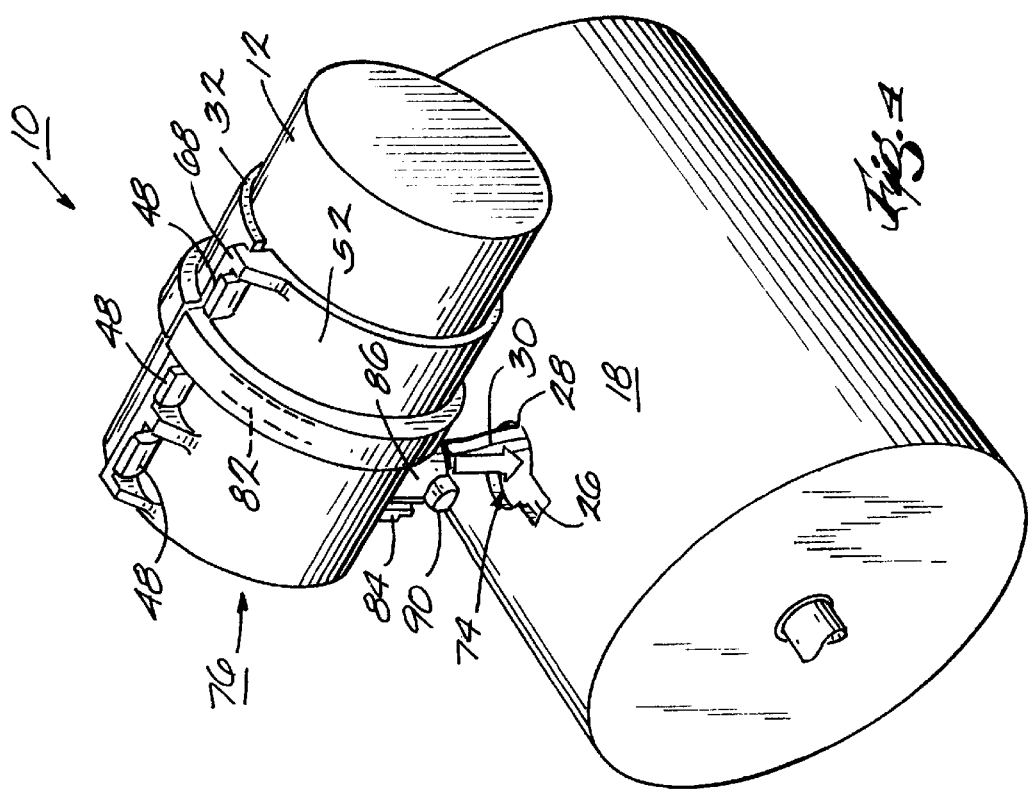

BRACKET TO ATTACH A CAPACITOR TO A MOTOR HOUSING

BACKGROUND OF THE INVENTION

This present invention relates to motor capacitor brackets, and more particularly to a motor capacitor bracket that secures the capacitor to the motor housing.

It is common practice to use brackets for mounting capacitors directly to the motor housing. Driven by a demand for simpler manufacture and faster assembly, it is known to use capacitor brackets that mount to the motor without the use of common fasteners such as threaded screws. One example of this type of capacitor bracket is disclosed in U.S. Pat. No. 5,493,158 issued Feb. 20, 1996.

SUMMARY OF THE INVENTION

The present invention provides an improved capacitor mounting bracket. More particularly, the invention provides a mounting bracket that safely and easily secures the capacitor to a motor housing without the use of common fasteners and without the need for tools. Furthermore, the capacitor can be readily removed from the bracket for repair or replacement.

Specifically, the invention provides a bracket for attaching a capacitor with an engagement portion to a motor having therein a keyhole, preferably with a rectangular portion and a circular portion. The bracket includes a first semicylindrical member including a first downwardly extending portion and a first hinge portion, and a second semicylindrical member including a second downwardly extending portion and a second hinge portion. The first hinge portion and second hinge portion engage to form a hinge with an axis. The semicylindrical members are pivotable about the hinge axis to open and closed positions.

In one embodiment, the first hinge portion includes at least two, preferably arcuate, tab members, each having a tab surface, extending from the first semicylindrical member. The second hinge portion includes a slot extension extending from the second semicylindrical member. The slot extension has therein slots, each slot including an engagement surface, preferably an arcuate surface, such that the tab members are insertable into the slots so that the tab surfaces are adjacent to the engagement surfaces thereby forming the hinge and the hinge axis.

When in the closed position, the semicylindrical members define a cylinder having an axis and including a capacitor engagement portion for engaging the capacitor when the bracket is in the closed position, thereby retaining the capacitor in the bracket. Preferably, the engagement portion of the bracket has therein an annular recess concentric with the cylinder axis. The capacitor engagement portion includes an annular projection so that the annular projection of the capacitor extends into the annular recess of the cylinder portion when the bracket is in the closed position, thereby retaining the capacitor in the bracket. When the semicylindrical members are in the open position, the capacitor may be removed from the bracket.

When the bracket is closed and ready to be mounted to the motor, the downwardly extending portions define a mounting extension having an axis perpendicular to the capacitor cylinder axis and including a horizontally extending locking extension. The mounting extension is insertable into the motor keyhole so that when the bracket is pivoted about the mounting extension axis to a locked position, the locking extension prevents removal of the mounting extension from the keyhole.

Preferably, the bracket further includes a rotation locking projection extending downwardly from one or both of the first semicylindrical member and the second semicylindrical member. The projection is capable of insertion into the keyhole, preferably the rectangular portion of the keyhole. When the bracket is pivoted about the mounting extension axis to the locked position, the projection engages the rectangular portion of the keyhole to substantially prevent rotation of the bracket from the locked position.

Other features and advantages of the invention will become apparent to those skilled in the art upon review of the following detailed description, claims, and drawings in which like numerals are used to designate like features.

BRIEF DESCRIPTION OF THE DRAWINGS

FIG. 4 is a perspective view of the mounting bracket being inserted into the motor housing.

FIG. 5 is a perspective view of the mounting bracket after insertion into the motor housing and rotation to a locked position.

Figure 1:
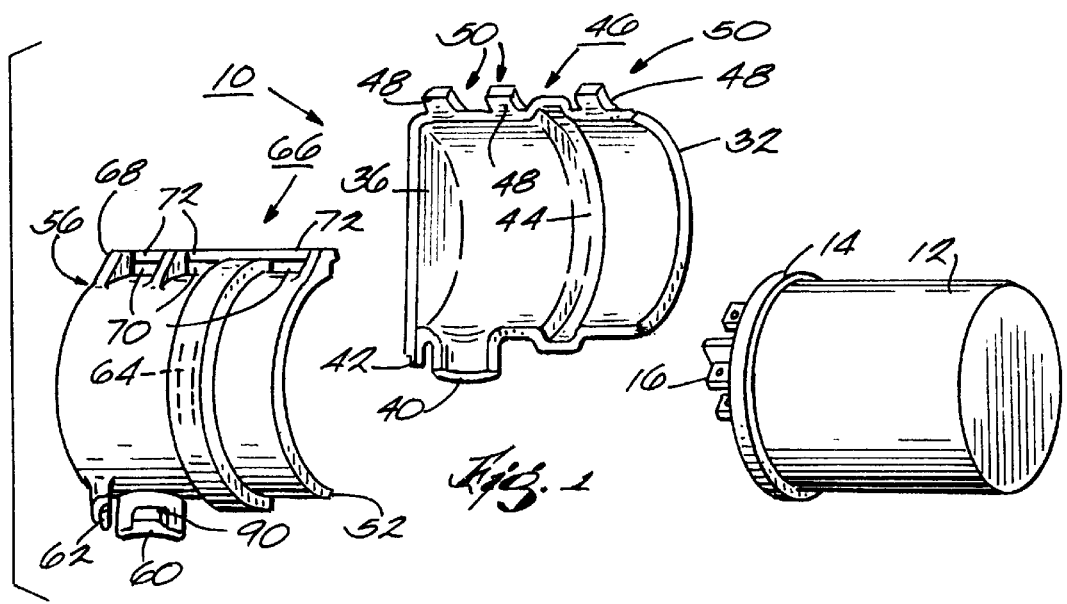
FIG. 1 is an exploded perspective view of a capacitor mounting bracket embodying the invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof. The use of "consisting of" and variations thereof herein is meant to encompass only the items listed thereafter and the equivalents thereof.

DETAILED DESCRIPTION OF THE PREFERRED EMBODIMENT

A capacitor mounting bracket 10 embodying the invention is shown in FIGS. 1–5. The mounting bracket 10 is designed to releasably house a cylindrical capacitor 12 that includes an annular projection 14 and a plurality of electrical contacts 16. The mounting bracket 10 is further designed to be removably mounted on a motor 18. A portion of the motor 18 includes an upper surface 20 (FIG. 2), a lower surface 22 (FIG. 2), and a keyhole 24 with a rectangular portion 26 and a circular portion 28 (FIG. 4). The motor 18 also includes electrical leads 30 that protrude from the keyhole 24 for electrical connection to the capacitor contacts 16 (see FIGS. 2 and 4).

Figure 6:
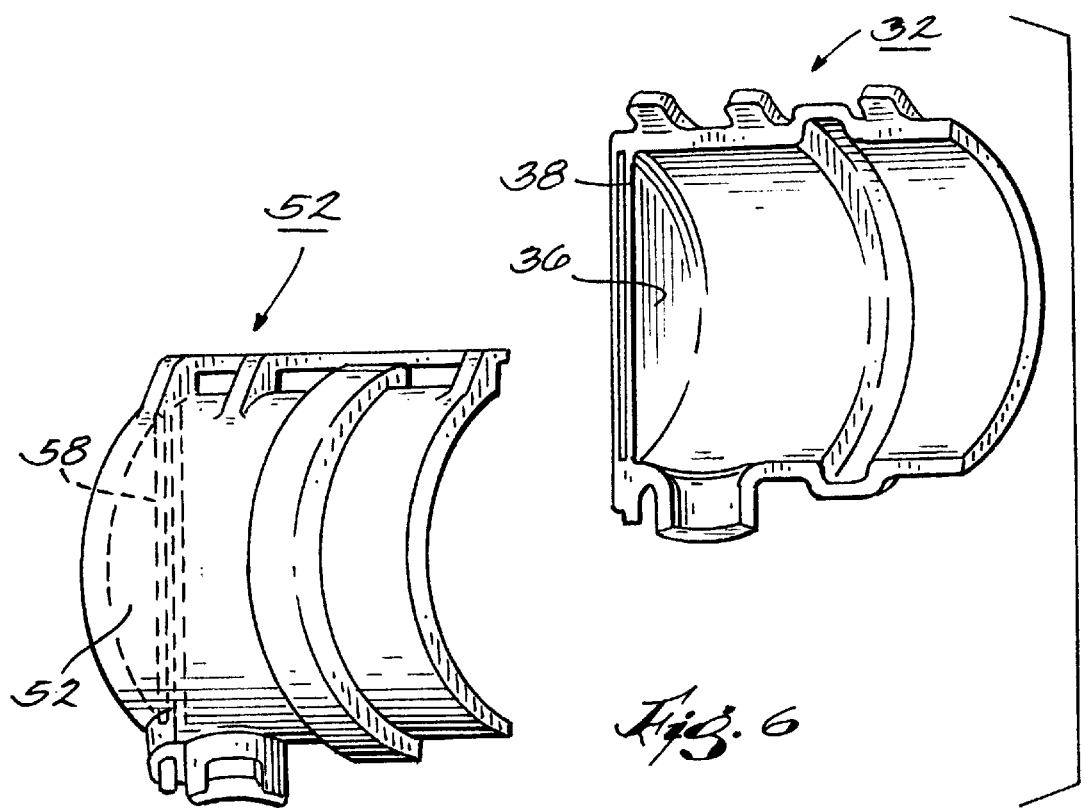
FIG. 6 is an exploded perspective view of an alternative capacitor mounting bracket embodying the invention.

With particular reference to FIG. 1, the mounting bracket 10 includes a first semicylindrical member 32 having at least one semicircular closed end portion 36. In an alternative embodiment, the closed end portion 36 preferably has therein an end portion recess 38 (FIG. 6), the purpose of which will be described below. The first semicylindrical member 32 also includes a first downwardly extending extension portion 40, a first downwardly extending rotation locking projection portion 42, a first annular recess 44, and a first hinge portion 46, the purposes of which will be described below. In a preferred embodiment, the first downwardly extending extension portion 40 is semicylindrical, but this need not be the case. The first hinge portion 46 includes at least two, but preferably three, outwardly extending, preferably arcuate, tab members 48. Each of the tab members 48 includes a tab surface 50, the purpose of which will be described below. The entire first semicylindrical member 32 is preferably made from injection molded plastic, but may be made from any other suitable material.

With continued reference to FIG. 1, the mounting bracket 10 also includes a second semicylindrical member 52 having at least one semicircular closed end portion 56. In an alternative embodiment, the closed end portion 56 preferably has therein an end portion projection 58 for mating engagement with the end portion recess 38 of the first semicylindrical member 32 (FIGS. 6–7), as will be further described below. The second semicylindrical member 52 also includes a second downwardly extending extension portion 60, a second downwardly extending rotation locking projection portion 62, a second annular recess 64, and a second hinge portion 66, the purposes of which will be described below. In a preferred embodiment, the second downwardly extending extension portion 60 is semicylindrical, but this need not be the case. The second hinge portion 66 includes an outwardly extending slot extension 68. The slot extension 68 includes slots 70, each having an engagement, preferably arcuate, surface 72. The entire second semicylindrical member 52 is also preferably made from injection molded plastic, but may be made from any other suitable material.

Figure 2:
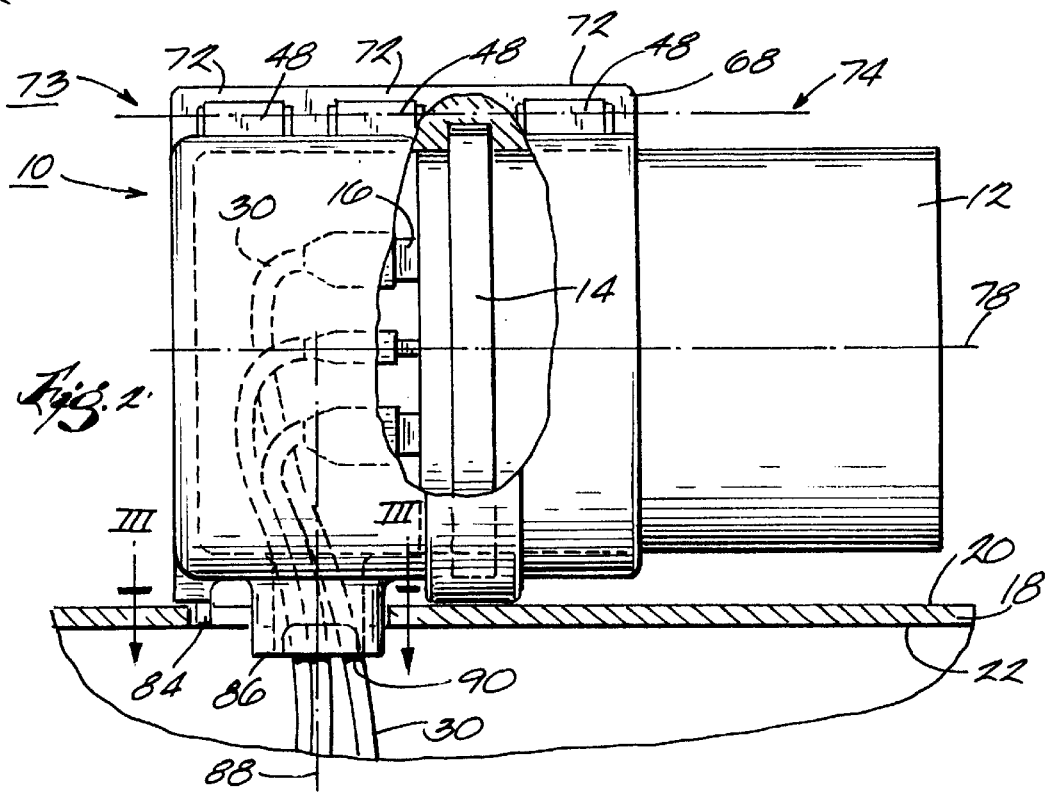
FIG. 2 is a partially sectioned side view of the capacitor mounting bracket of FIG. 1 mounted to a motor housing.
Figure 3:
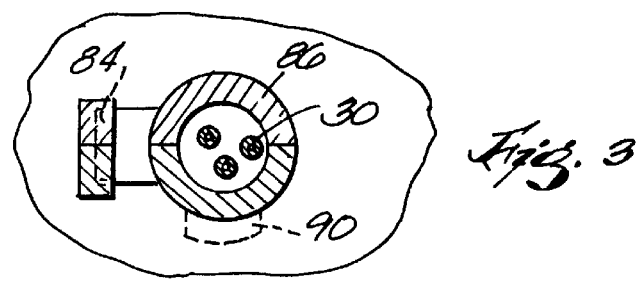
FIG. 3 is a section view taken along line III—III of FIG. 2.

With reference to FIGS. 4 and 5 in conjunction with FIG. 1, the mounting bracket 10 is assembled by inserting the tab members 48 of the first hinge portion 46 into the slots 70 of the second hinge portion 66 such that the tab surfaces 50 contact the engagement slot surfaces 72 and form a hinge 73 having an axis 74 (FIG. 2). Preferably, the number of slots 70 correspond with the number of tabs 48. The first and second semicylindrical members 32 and 52 are pivotable about the hinge axis 74 to open and closed positions.

When in the closed position, the first and second semicylindrical members 32 and 52 define a cylinder 76 (FIGS. 4 and 5) having a central axis 78 (FIG. 2) and a closed end 80 (FIGS. 5 and 7) formed by the engagement of the first semicircular end portion 36 and the second semicircular end portion 56. The first and second annular recesses 44 and 64 together define an annular recess 82 (see FIGS. 4–5) concentric with the central axis 78. The rotation locking projection portions 42 and 62 together define a, preferably resilient, rotation locking projection 84 (see FIGS. 2 and 4–5), the purpose of which will be described below. It is important to note that the invention need not include two rotation locking projection portions 42 and 62. Rather, the invention could utilize a single rotation locking projection portion or multiple rotation locking projection portions.

The semicylindrical extension portions 40 and 60 together define an open-ended mounting cylinder 86 having an axis 88 perpendicular to the capacitor cylinder axis 78 (FIG. 2). Locking extension 90 extends radially outward from the mounting cylinder 86 (FIGS. 1–5). In the illustrated embodiment, the locking extension 90 is integral with, and extends from, the second semicylindrical extension portion 60, but could alternatively extend from the first semicylindrical extension portion 40.

Enclosing the capacitor 12 in the bracket 10 and mounting the bracket 10 to the motor 18 occurs as follows. First, the leads 30 are connected to the contacts 16. Next, the first and second semicylindrical members 32 and 52 are positioned around the capacitor 12 such that the annular projection 14 is aligned with the annular recess 82, and the leads 30 extend between the first and second semicylindrical extension portions 40 and 60. As the mounting bracket 10 is closed, the annular projection 14 is retained within the annular recess 82 and the capacitor 12 is secured. The leads 30 extend through the open end of the mounting cylinder 86 and into the keyhole 24.

Figure 7:
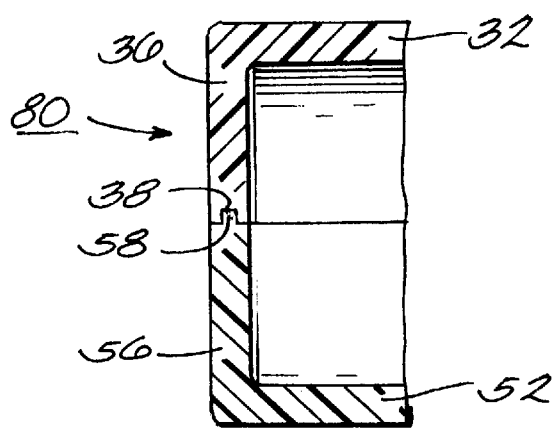
FIG. 7 is a cross-sectional top view of a portion of the capacitor mounting bracket of FIG. 6 in final assembly.

In a preferred embodiment, (see FIG. 2) the bracket 10 is only closed on one end, allowing the capacitor 12 to project axially from the open end. The electrical contacts 16 are, however, safely and completely surrounded by the first and second cylindrical members 32 and 52 when in the closed position (see FIG. 2). This eliminates any safety risk associated with leaving electrical contacts 16 exposed. In an alternative embodiment, the end portion projection 58 mates with the end portion recess 38 to provide an enhanced sealing arrangement between the closed end portions 36 and 56 of the semicylindrical members 32 and 52 (FIG. 7). Alternatively, other embodiments of the mounting bracket 10 could include two closed ends, which would allow the bracket 10 to completely enclose the capacitor 12.

With the capacitor 12 secured, the bracket 10 can be mounted to the motor 18. The bracket 10 (see FIG. 4) is aligned over the keyhole 24 such that the mounting cylinder 86 lines up with the circular portion 28 and the locking extension 90 lines up with the rectangular portion 26. The bracket 10 is inserted into the keyhole 24 carefully such that the leads 30 are fed into the motor through keyhole 24. Once inserted (see FIG. 5), the bracket 10 is rotated approximately 90 degrees until the rotation locking projection 84 snaps into place by engaging the rectangular portion 26, preventing rotation from the locked position. At this point (see FIGS. 3 and 5), the locking extension 90 is adjacent the lower surface 22 of the motor 18 thereby preventing removal of the capacitor bracket 10 from the keyhole 24 and securing the bracket 10 to the motor 18.

Removal of the bracket 10 from the motor 18 occurs in the reverse order. The resilient rotation locking projection 84 is manually deflected such that the bracket 10 is free to rotate approximately 90 degrees until the locking extension 90 is aligned with the open rectangular portion 26. The capacitor bracket 10 can then be removed from the keyhole 24 and the bracket 10 pivoted about hinge axis 74 to the open position, thereby releasing the capacitor 12. Once the leads 30 are disconnected, the capacitor 12 is free to be repaired or replaced.

The foregoing description of the present invention has been presented for purposes of illustration and description. Furthermore, the description is not intended to limit the invention in the form disclosed herein. Consequently, variations and modifications commensurate with the above teachings in skill or knowledge of the relevant art, are within the scope of the present invention. The embodiments described herein are further intended to explain the best modes known for practicing the invention and to enable others skilled in the art to utilize the invention as such, or other embodiments and with various modifications required by the particular applications or uses of the present invention. It is intended that the appended claims are to be construed to include alternative embodiments to the extent permitted by the prior art.

Various features of the invention are set forth in the following claims.

What is claimed is:

1. A bracket for attaching a capacitor with an annular projection to a motor having therein a keyhole with a rectangular portion and a circular portion, the bracket comprising:

a first semicylindrical member including a closed end portion having therein an end portion recess, a first downwardly extending semicylindrical extension portion, a first downwardly extending rotation locking projection portion and a first hinge portion including at least two outwardly extending arcuate tab members having tab surfaces;

a second semicylindrical member including a closed end portion having an end portion projection, a second downwardly extending semicylindrical extension portion, a second downwardly extending rotation locking projection portion and a second hinge portion including an outwardly extending slot extension having therein slots, each slot including an arcuate surface, the tab members of the first hinge portion being insertable into the slots of the second hinge portion so that the tab surfaces are adjacent to the arcuate slot surfaces thereby forming a hinge having an axis, the semicylindrical members being pivotable about the hinge axis to open and closed positions;

the semicylindrical members defining, when in the closed position, a cylinder having an axis and a closed end formed by the engagement of the first semicircular end portion recess and the second semicircular end portion projection, the cylinder having therein an annular recess concentric with the cylinder axis so that the annular projection of the capacitor extends into the annular recess of the cylinder portion when the bracket is in the closed position, thereby retaining the capacitor in the bracket, and the semicylindrical members permitting, when in the open position, the capacitor to be removed from the annular recess and from the bracket;

the rotation locking projection portions defining, when the bracket is in the closed position, a rotation locking projection; and the semicylindrical extension portions defining, when the bracket is in the closed position, a mounting cylinder having an axis perpendicular to the capacitor bracket cylinder axis and including a locking extension perpendicular to the mounting cylinder axis, the mounting cylinder being insertable into the motor keyhole so that the mounting cylinder extends through the circular portion of the motor keyhole and the locking extension extends through the rectangular portion of the motor keyhole, and so that when the bracket is pivoted about the mounting cylinder axis to a locked position, the locking extension prevents removal of the mounting cylinder from the keyhole and the rotation locking projection extends into the rectangular portion of the keyhole to prevent rotation of the bracket from the locked position.

2. A bracket system for attaching a capacitor to a motor, the bracket system comprising:

a capacitor including an annular projection;

a motor portion including an upper and a lower surface, the motor portion having therein a keyhole, the keyhole including a rectangular portion and a circular portion;

a first semicylindrical member including a closed end portion having therein an end portion recess, a first downwardly extending semicylindrical extension portion, a first downwardly extending rotation locking projection portion and a first hinge portion including at least two outwardly extending arcuate tab members having tab surfaces;

a second semicylindrical member including a closed end portion having an end portion projection, a second downwardly extending semicylindrical extension portion, a second downwardly extending rotation locking projection portion and a second hinge portion including an outwardly extending slot extension having therein slots, each slot including an arcuate surface, the tab members of the first hinge portion being insertable into the slots of the second hinge portion so that the tab surfaces are adjacent to the arcuate slot surfaces thereby forming a hinge having an axis, the semicylindrical members being pivotable about the hinge axis to open and closed positions;

the semicylindrical members defining, when in the closed position, a cylinder having an axis and a closed end formed by the engagement of the first semicircular end portion recess and the second semicircular end portion projection, the cylinder having therein an annular recess concentric with the cylinder axis so that the annular projection of the capacitor extends into the annular recess of the cylinder portion when the bracket is in the closed position, thereby retaining the capacitor in the bracket, and the semicylindrical members permitting, when in the open position, the capacitor to be removed from the cylindrical recess and from the bracket;

the rotation locking projection portions defining, when the bracket is in the closed position, a rotation locking projection; and the semicylindrical extension portions defining, when the bracket is in the closed position, a mounting cylinder having an axis perpendicular to the capacitor bracket cylinder axis and including a locking extension parallel to the capacitor bracket cylinder axis, the mounting cylinder being insertable into the motor keyhole so that the mounting cylinder extends through the circular portion and the locking extension extends through the rectangular portion, and so that when the bracket is pivoted about the mounting cylinder axis to a locked position, the locking extension prevents removal of the mounting cylinder from the keyhole and the rotation locking projection extends into the rectangular portion to prevent rotation of the bracket from the locked position.

3. A bracket for attaching a capacitor with an engagement portion to a motor portion including an upper and a lower surface and further including therein a keyhole, the bracket comprising:

a first half member including a first downwardly extending portion and a first hinge portion;

a second half member including a second downwardly extending portion and a second hinge portion, the first hinge portion and second hinge portion being engageable to form a hinge with an axis, the members being pivotable about the hinge axis to open and closed positions;

the half members defining, when in the closed position, a full member having an axis and including a capacitor engagement portion for engaging the capacitor engagement portion when the bracket is in the closed position, thereby retaining the capacitor in the bracket, and the member permitting, when in the open position, the capacitor to be removed from the bracket; and the downwardly extending portions defining, when the bracket is in the closed position, a mounting extension having an axis perpendicular to the capacitor bracket axis and including a horizontally extending locking extension, the mounting extension being insertable into the motor keyhole, so that when the bracket is pivoted about the mounting extension axis to a locked position, the locking extension is adjacent the lower surface of the motor thereby preventing removal of the capacitor bracket from the keyhole.

4. The bracket of claim 3, wherein the motor keyhole includes a rectangular portion and a circular portion and, wherein the mounting extension extends through the circular portion of the motor keyhole and the locking extension extends through the rectangular portion of the motor keyhole, so that when the bracket is pivoted about the mounting extension axis to a locked position, the locking extension prevents removal of the mounting cylinder from the keyhole.

5. The bracket of claim 3, wherein the half members are semicylindrical members.

6. The bracket of claim 3, wherein each half member has a closed end portion, the first end portion having therein an end portion recess and the second end portion including an end portion projection, so that when the half members are in the closed position a closed end is formed by the engagement of the first end portion recess and the second end portion projection.

7. The bracket of claim 3, wherein the capacitor bracket engagement portion has therein a recess positioned around the capacitor bracket axis and wherein the capacitor engagement portion includes an annular projection so that the annular projection of the capacitor extends into the annular recess of the capacitor bracket when the bracket is in the closed position, thereby retaining the capacitor in the bracket, and the half members permitting, when in the open position, the capacitor to be removed from the bracket.

8. The bracket of claim 3, wherein the first hinge portion includes at least two tab members extending from the first half member, the tab members each including a tab surface, and wherein the second hinge portion includes a slot extension extending from the second half member, the slot extension having therein slots, each slot including an engagement surface, the tab members being insertable into the slots so that the tab surfaces engage the engagement surfaces thereby forming a hinge having an axis, the half members being pivotable about the hinge axis to open and closed positions.

9. The bracket of claim 3, wherein the first downwardly extending portion is semicylindrical and wherein the second downwardly extending portion is semicylindrical, the first downwardly extending portion and the second downwardly extending portion defining a cylinder when the semicylindrical members are in the closed position.

10. The bracket of claim 3 further including a rotation locking projection extending downwardly from the full member, the projection being insertable into the keyhole when the bracket is pivoted about the mounting extension axis to the locked position, to substantially prevent rotation of the bracket from the locked position.

* * * * *